United States Patent Office 3,228,875
Patented Jan. 11, 1966

3,228,875
REFINING OF LUBRICATING OILS
Jacques Demeester, Paris, France, assignor to The British Petroleum Company, Limited, London, England, a British joint-stock corporation
No Drawing. Filed Mar. 19, 1962, Ser. No. 180,875
Claims priority, application France, Mar. 29, 1961, 857,233
9 Claims. (Cl. 208—264)

This invention relates to the treatment of lubricating oils.

In the production of lubricating oils, it is necessary to give the oils a finishing treatment in order to give them a satisfactory color and appearance and satisfactory heat and storage stability. The finishing treatment must not bring about any substantial change in the molecular structure of the oil, in particular there must be no appreciable drop in viscosity.

The finishing treatment that has been employed for many years consists in contacting the oil at high temperature with activated clay or percolating the oil through a fixed bed of granular clay. Both these treatments have the disadvantage that they involve the handling of large quantities of solid matter while the disposal of spent clay is an additional disadvantage of the contact process.

Some lubricants require acid treatment in addition to clay treatment and in this case the disposal of acid tar is a further embarrassment.

Catalytic reforming processes have made available large quantities of gases rich in hydrogen, thus rendering economically attractive methods of refining by means of hydrogen, and the use of a mild hydrogen treatment as an alternative to acid and/or clay treatment is being adopted on an increasing scale. The process is called hydrofinishing.

A catalyst commonly employed in the hydrofinishing process comprises the oxides of cobalt and molybdenum incorporated with an activated alumina support. This catalyst is capable of giving the desired color but does not always give a sufficient stability and this difficulty is more apparent in the case of oils which have not been solvent refined and which usually need to be treated with sulfuric acid and clay. I have previously discovered that improved results with respect to the color stability of the finished oils may be obtained by using a catalyst comprising the oxides of iron, cobalt and molybdenum incorporated with an activated alumina support.

It has been found that the optimum content of iron oxide is in the region of 14–15% wt. of the catalyst and the preparation of catalysts containing this amount of iron oxide on an activated alumina base presents certain practical difficulties. It has been established that the most active catalysts are obtained if an alumina base prepared from an alumina hydrate consisting wholly or largely of trihydrate is impregnated with a solution of an iron salt from which the iron oxide is subsequently derived and the impregnation of the alumina support with such quantities of iron salt solution is not an easy matter.

It has now been found that a catalyst having satisfactory activity may be produced by incorporating the oxides of cobalt and molybdenum with a support consisting of a bauxite having a substantial content of iron oxide.

According to the invention therefore, a process of producing lubricating oils having improved color and oxidation stability comprises treating the oils with hydrogen at elevated temperature and pressure in the presence of a catalyst consisting of the oxides of cobalt and molybdenum incorporated with a support consisting of a bauxite having a substantial content of iron oxide.

The bauxite should preferably contain at least 10% by weight of iron oxide, and a particularly suitable bauxite is Guyane bauxite which is of the hydrargillite type and contains 15% of iron oxide.

According to a further feature of the invention, the bauxite may advantageously be calcined at an elevated temperature before the oxides of cobalt and molybdenum are incorporated therewith. The calcination may be carried out at a temperature in excess of 600° C. but below 900° C., preferably at 800° C.

The content of the oxides of cobalt and molybdenum is not critical but the best results are obtained in all cases with a ratio of molybdenum oxide to cobalt oxide of at least 3:1.

When treating lubricating oils containing an appreciable quantity of sulfur, it is desirable to operate at sufficiently low temperature to avoid an undue reduction in the viscosity of the oil. Temperatures in the range 150 to 340° C. have been found to be suitable for such sulfur-containing oils, preferably 250 to 320° C.

The pressure may vary between 5 ats. and 80 ats. but in practice one will use a pressure corresponding to the pressure of the hydrogen-rich gases from catalytic reforming processes which may be at 20 to 30 ats. The hydrogen feedrate is also variable but low, being from 5 to 150 volumes per volume of oil under normal conditions. A preferred value is in the region of 23 vols. per vol. of oil. The feedrate can very from 0.5 to 6 vols. of oil per vol. of catalyst per hour, the higher values being suitable for solvent-refined oils.

In order to develop the full activity of the catalyst, it is advantageous to submit it to a preliminary activation treatment which can conveniently be carried out in the reactor in which the catalyst is to be used.

The catalyst may be activated by passing over it a petroleum distillate or a mineral lubricating oil, preferably of low viscosity and non-solvent-refined, under a pressure of hydrogen and at a temperature of at least 300° C. for a period of at least 12 hours. The following conditions, for example, would be satisfactory.

Temperature _____ 325° C.
Space velocity _____ 1 vol./vol./hour.
Pressure _____ 20 ats.
Hydrogen flow rate _____ 20 vol./vol./hour.
Time _____ 48 hours.

While the minimum temperature of 300° C. is a critical condition, the other conditions can be varied within wide limits.

In all cases the catalyst according to the invention can be sulfurized before use.

The improvements to be obtained by the use of a catalyst according to the present invention are illustrated by the following experiments.

The experiments were carried out on an oil from Kuwait crude that had not been solvent refined and had the following properties.

Density _____ 0.914
Viscosity Engler at 50° C. _____ 2.4
Viscosity Index _____ 45.0
Ramsbottom carbon, percent wt. _____ 0.1
Flash point, ° C. _____ 198
Pour point, ° C. _____ −24
Acidity mgr./KOH/gr. _____ 0.23
Color A.S.T.M. _____ 2½

The following catalysts were used for the treatment of the above oil.

Table 1

| Cat. | Composition, percent wt. | | | Ratio, MoO₃/CoO, wt. | Percent active oxides, wt. | Method of preparation |
|---|---|---|---|---|---|---|
| | $MoO_3$ | CoO | $Fe_2O_3$ | | | |
| 231 | 8.0 | 2.2 | 12.1 | 3.6 | 22.3 | 2.5 mm. granules of bauxite activated at 450° C., impregnated with cobalt nitrate and ammonium molybdate. |
| 286 | 15 | 3.6 | 15.7 | 4.1 | 34.3 | As for 231 but bauxite calcined at 800° C. |

The catalysts were tested under the following standard conditions.

Pressure _____ 20 kg./cm.²
Space Velocity _____ 25 vols. per vol. of oil.
Hydrogen rate _____ 1 v./v./hr.

Concurrent flow of oil and hydrogen.

Each test was begun at 350° C. and the temperature lowered progressively to 250° C.

The results obtained are set out in the following Table No. 2.

Table 2

| Catalyst | Properties | Operating temperature, ° C. | | | | | | Optimum temperature | Optimum color density increase |
|---|---|---|---|---|---|---|---|---|---|
| | | 350 | 325 | 300 | 275 | 250 | 225 | | |
| 231 | Color ASTM | 2 | 2 | 1½ | 1½ | 2 | 2 | 295 | 0.22 |
| | Color density | 0.70 | 0.60 | 0.53 | 0.48 | 0.56 | 0.84 | | |
| | Color density increase | 0.65 | 0.38 | 0.23 | 0.25 | 0.34 | 0.51 | | |
| 286 | Color ASTM | 1½ | 1½ | 1½ | 1½ | 1½ | 1½ | 265 | 0.10 |
| | Color density | 0.50 | 0.38 | 0.34 | 0.34 | 0.35 | 0.41 | | |
| | Color density increase | 0.42 | 0.32 | 0.22 | 0.12 | 0.13 | 0.37 | | |

The color of the oil is expressed by reference to what is called the "color density." The oil must be sold to a maximum color specification which is fixed as the objective of the finishing treatment. The "color density" is a comparative measure of the color of the oil with reference to this specification. The sample of which it is desired to measure the color is placed in a comparative colorimeter of the Duboscq type opposite a sample having a color corresponding to the maximum commercial specification.

The "color density" is expressed by the ratio of the heights of oil giving an equal absorption. A calibrated electric photo-colorimeter is used to read the color density directly.

The color stability is expressed by the "increase in color density" which is measured by the difference between the color density of the oil before and after an ageing test carried out under out under standardized conditions. The method of ageing is as follows.

10 cc. of the oil are placed in a cylinder of defined dimensions identical to that required for the ageing test of the British Air Ministry, Method IP.48. The tube is closed by a piece of cotton in order to protect the sample from dust. It is then placed in a bath maintained at 85° C. and is left there for 16 hours. After this time, the cylinder is withdrawn from the bath and allowed to cool. The color density of the aged oil is determined as for the new oil by means of the calibrated photo-colorimeter.

I claim:

1. A process for refining a lubricating oil to impart improved color and oxidation stability properties thereto which comprises contacting the oil with hydrogen at a temperature within the range 150–340° C., a pressure within the range 5–80 atmospheres, and in the presence of a catalyst consisting of the oxides of cobalt and molybdenum incorporated with a support consisting of a bauxite having, as a naturally occurring component thereof, at least 10% by weight of iron oxide, said bauxite, before use, being calcined at a temperature aboue 600° C. but below 900° C., before the oxides of cobalt and molybdenum are incorporated therewith.

2. A process according to claim 1, wherein the ratio of molybdenum oxide to cobalt oxide by weight is at least 3.

3. A process according to claim 1, wherein the hydrogen feedrate is within the range 5 to 150 volumes per volume of oil.

4. A process according to claim 1, wherein the oil feedrate is within the range 0.5 to 6 vols. of oil per volume of catalyst per hour.

5. A process according to claim 1, calcination being at 800° C.

6. A process according to claim 1, wherein the treating temperature is within the range 250° to 320° C.

7. A process according to claim 1, wherein the treating pressure is within the range 20 to 30 ats.

8. A process according to claim 1, wherein the hydrogen feedrate is 23 vols. per vol. of oil.

9. A process according to claim 1, wherein the catalyst is first activated before treating the oils by passing over it a hydrocarbon oil under a pressure of hydrogen and at a temperature of at least 300° C. for a period of at least 12 hours.

References Cited by the Examiner

UNITED STATES PATENTS 2,921,025  1/1960  Holm et al. _____ 208—264
3,020,228  2/1962  Demeester _____ 208—264

DELBERT E. GANTZ, *Primary Examiner.*

ALPHONSO D. SULLIVAN, *Examiner.*

S. P. JONES, *Assistant Examiner.*